March 10, 1936.　　　　J. E. MOOSE　　　　2,033,388
PROCESS FOR THE PRODUCTION OF AMMONIUM PHOSPHATE
Filed Nov. 24, 1933
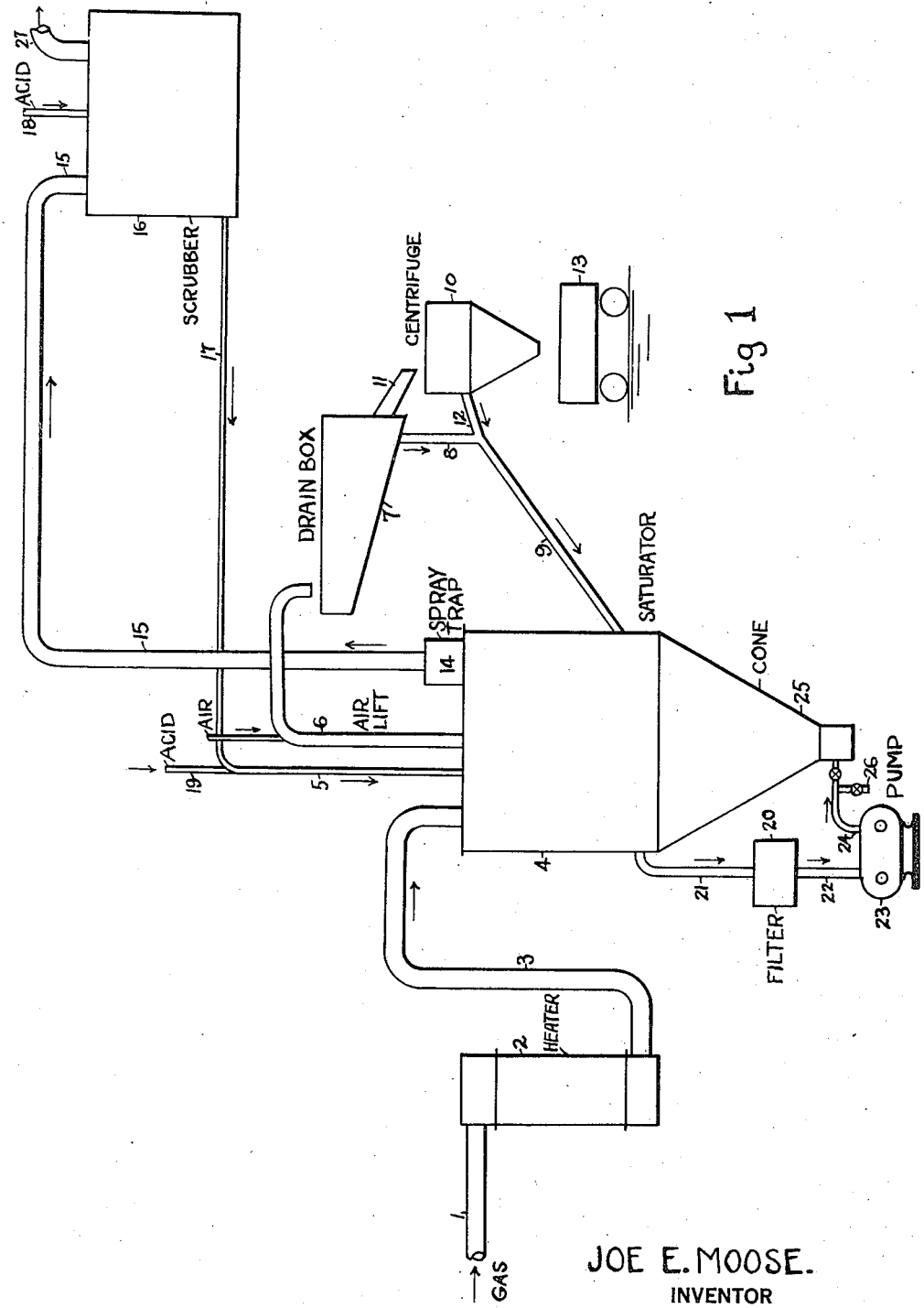
JOE E. MOOSE.
INVENTOR
BY Herbert J Chase
ATTORNEY Patented Mar. 10, 1936

2,033,388

UNITED STATES PATENT OFFICE 2,033,388

PROCESS FOR THE PRODUCTION OF AMMONIUM PHOSPHATE

Joe E. Moose, Anniston, Ala., assignor to Swann Research, Inc., a corporation of Alabama Application November 24, 1933, Serial No. 699,519

10 Claims. (Cl. 23—107)

This invention relates to a process for the production of ammonium phosphate, by which term I mean to include both the mono- and diammonium phosphate.

One object of this invention is the provision of a direct process by which ammonium phosphate may be produced continuously by reaction of ammonia gas and phosphoric acid. Another object is the provision of a process in which such a reaction is susceptible to accurate control to the end that either the mono- or diammonium phosphate may be produced. A further object is the provision of a process by which pure ammonium phosphates may be produced by the use of relatively impure ingredients, such as by-product ammonia and crude phosphoric.

By a "direct process" I mean a process in which the ammonia contained in by-product gases is directly combined with phosphoric acid, and, hence, this term has the same meaning as when used in connection with the familiar ammonium sulphate process.

It has, of course, already been suggested that by-product ammonia, such as occurs in coke-oven gases, be combined with phosphoric acid to produce the ammonium phosphates. In spite of these early suggestions, no successful continuous process has, to my knowledge, ever been perfected and operated, notwithstanding the many important commercial advantages which the solution of this problem presented.

In some of the issued patents on processes for the manufacture of the ammonium phosphates, methods are disclosed in which gaseous ammonia is reacted in a packed tower with weak phosphoric acid, after which the solution of monoammonium phosphate is concentrated in an evaporator until the crystallization point is reached. In some prior processes, concentrated acid and concentrated ammonia are employed; while in others an effort is made to utilize the heat of neutralization to evaporate water and thereby eliminate the secondary evaporation step.

In another more recent patent a partial solution of the problem is presented, whereby more or less crude monoammonium phosphate suitable for fertilizer use is produced by the neutralization of crude phosphoric with ammonia containing gases such as coke-oven gas. In this process a neutralization of phosphoric acid to a stage half-way between the mono- and diammonium phosphate is effected, after which the reaction mixture is removed from the saturator and acidified with phosphoric acid to convert the diammonium phosphate to the mono-salt.

The objections to such processes are that they are not suitable for the production of pure phosphates nor are they as convenient and economical as the herein disclosed process.

I have now discovered that the ammonium phosphates may be prepared by reacting gaseous ammonia and phosphoric acid together in a reaction mixture of predetermined hydrogen ion concentration. By this I mean that the conditions, so far as hydrogen ion concentration is concerned, must be rather closely controlled, since, as I will show in more detail later, it is not possible to make a particular ammonium phosphate by an economical process under all conditions under which such ammonium phosphate is produced in solution. As evidence for this statement, it is generally known that monoammonium phosphate, for example, will be formed in solution over a wide range of hydrogen ion concentrations, i. e., from about a pH of 3.0 to 6.5; however, only over a rather very definite range of acid concentration is it possible to produce crystals of this salt which can be readily and continuously removed from the saturator and in pure form. The reason for the existence of a definite workable range of acid concentrations is that the properties of the solution, such as specific gravity and viscosity, and the properties of the crystals formed therefrom, are greatly influenced by the acid concentration.

In the case of the formation of diammonium phosphate crystals by a similar reaction, it is known that these crystals will form over a rather wide range of hydrogen ion concentrations, for example, a range of pH of from 6.8 to 7.8 is generally accepted. However, only over a restricted range of hydrogen ion concentrations is it possible to produce crystals from saturated solutions which can be readily and continuously removed from the saturator and in a pure form.

As a result of extensive tests on the influence of hydrogen ion concentration on the properties of ammonium phosphate crystals, I have come to the conclusion that such crystals are probably more sensitive to acid concentration than are the crystals of ammonium sulphate, which compound is now so commonly made as a by-product in coke manufacturing plants. For example, in the case of monoammonium phosphate, the crystals forming from a saturated solution with a pH between 3.0 and 5.6 are small, irregular needles which have a marked tendency to mat together and to adhere firmly to metallic surfaces. The crystals forming from a solution with a pH between 5.6 and 6.2 are large and of a non-clinging type. I have also noted that the crystalline habit of the crystals forming within this pH range changes from the needle type forming in a pH range of 5.6 to 5.8 to a pronounced prismatic type in a pH range of from 5.8 to 6.4. At the same time the length of the individual crystals is considerably shortened in going from the lower to the higher pH, the crystals becoming bulkier individually and better defined from a crystallographic standpoint. Throughout the preferred pH range (5.8 to 6.2) for formation of monoammonium phosphate, pronounced twinning of the crystals occurs, the type formed being largely the penetration twin.

In an analogous manner the crystal forms of diammonium phosphate are closely related to the hydrogen ion concentration of the solution from which they are formed. Crystals forming from a solution with a relatively low pH (between 6.6–6.8) are relatively very small and ill-defined structurally. With a pH between 6.8 to 7.0, the crystals are decidedly larger; and, when a pH of 7.2 to 7.4 is reached, the crystals are large and well formed, do not adhere to the metallic surfaces of the saturator, and settle rapidly from the solution. With the preferred range of pH of the solution (between 7.0–7.4) the crystals have a tendency to crystallize with a minimum amount of occluded impurity, giving a very pure product.

In the above discussion I have dealt in detail with the effect of hydrogen ion concentration on crystal growth and habits because an understanding of these relations is necessary for the successful operation of my process as well as for an understanding of the reasons why prior attempts to recover ammonia as the phosphate from by-product gas by a direct process have not met with the success which the recovery of ammonia as the sulphate has attained.

The following description, when read in connection with the accompanying drawing, will serve as an example of one way in which my invention may be practiced.

Referring to Figure 1, a by-product gas, such, for example, as coke-oven gas containing about 1% of $NH_3$ by volume, passes by means of pipe 1 into a heater 2 where its temperature may be adjusted, if necessary. The gas then passes by means of pipe 3 into saturator 4, where the contained ammonia is neutralized by means of phosphoric acid in a solution of suitable hydrogen ion concentration. Acid is added to the saturator solution by means of pipe 5, either continuously or intermittently, in order to maintain the desired predetermined acid concentration in the saturator. The crystals of ammonium phosphate are removed from the saturator by the air lift 6, of conventional design, and deposited, together with mother liquor, in drain box 7. Excess mother liquor will then drain off and be conveyed by pipes 8 and 9 back to saturator 4. From time to time the crystals which have collected are removed from the drain box to the centrifuge 10 by means of sluice-way 11. Mother liquor removed from the crystals in the centrifuge is returned by means of pipes 12 and 9 to the saturator 4. The dewatered crystals are then discharged into container 13.

The scrubbed gases leaving saturator 4 through spray trap 14 may in some cases contain traces of ammonia, especially when diammonium phosphate is being produced in saturator 4. The actual amount of ammonia in the scrubbed gases is relatively small, amounting to from 5% to 20% of that entering the scrubber; and, hence, in many cases the gas may be further processed without regard to its presence. If, however, it should be desired to free the gases of all ammonia, I prefer to scrub them with a further quantity of acid. This is done conveniently by bringing the gases into secondary scrubber 16 by means of pipe 15, and therein contacting the gases with a further quantity of phosphoric acid contained in scrubber 16, the gases leaving scrubber 16 by means of pipe 27 to means of utilization not shown. The concentration of acid and ammonia contained in scrubber 16 will, for most conditions of operation, be of such a degree that no crystallization will take place therein. The partly neutralized acid will then be conveyed by pipes 17 and 5 to saturator 4, wherein the optimum conditions for formation of the desired ammonium phosphate will be maintained. Fresh acid may be introduced at 18 or 19. It will thus be apparent that my process may be operated to recover all of the ammonia present in the gas as an ammonium phosphate.

By operating according to the present process, I am not confined to any particular strength of acid. If strong acid, say 75% $H_3PO_4$, is available, I find it necessary to supply very little heat to the gases by means of heater 2. If weaker acid is supplied to the saturator, I may increase the heat in the gases somewhat, in order to keep the amount of liquid in the saturator at a constant level. If the gases contain too much heat, it may be necessary to add water to the saturator to maintain the desired constant level.

The specific conditions necessary to be maintained in saturator 4 when producing a particular ammonium phosphate will now be described.

Diammonium phosphate

When producing this salt from a coke-oven gas and phosphoric acid, I prefer to operate the saturator at a temperature somewhere between 40° and 60° C. and somewhat more advantageously between the limits of 45°–50° C. The solution which will be established in saturator 4 when operating continuously will contain diammonium phosphate and phosphoric acid in such proportions that the hydrogen ion concentration will be maintained between the limits of 6.8 to 7.6, the preferred limits being between 7.2 and 7.4. I have found that most satisfactory operation, from the standpoint of crystal size, will be obtained within the latter limits; although it is possible to obtain less efficient operation over a range including the wider limits above stated. If it is desired to obtain a crystal of maximum purity, the pH should be maintained within the narrower limits given above, and particularly as close to 7.4 as possible. The ammonia recovered by combination will, of course, vary with the temperature of the saturator and the pH of the liquor, being somewhat higher in the lower pH range. For the complete recovery of any ammonia passed through the saturator in the scrubbed gas, I prefer to employ the secondary scrubber 16, as above described.

The temperature of the saturator solution should be maintained within the range of 40°–60° C., and advantageously within the range of 45°–50° C., either by heating the incoming gas in the heater 2 or by supplying external heat to the saturator itself. By regulating the quantity of heat supplied with the gas, it is possible to control the evaporation of water from the saturator and thus prevent accumulation of mother liquor.

As I have pointed out above, when working within the optimum pH range (7.2 to 7.4) for the production of a pure grade of diammonium phosphate, the crystals of this salt have a pronounced tendency when forming of expelling impurities present in the mother liquor from which they are formed. As a consequence the mother liquor becomes more concentrated with respect to impurities, and it becomes increasingly difficult for pure crystals to form. For this reason I find it desirable to remove a certain part of the mother liquor and pass it through a filter, whereby such impurities are removed from the solution.

Referring again to Figure 1 of the drawing, a filter 20 is shown supplied with mother liquor by pipe 21, which connects with the saturator 4. The filtered mother liquor passes by means of pipe 22 into pump 23, whereby it is returned by pipe 24 into the crystal hopper 25 which forms the lower part of saturator 4. By operating in this way, the crystals within cone 25 are washed by a supply of filtered mother liquor, and the surface impurities removed. Since the crystal ejector 6 removes crystals from the lowest part of cone 25, it will therefore remove crystals having a higher degree of purity. By operating in this manner, I have produced large, well-formed crystals of diammonium phosphate containing as little as 0.016% iron and alumina phosphate by the use of coke-oven gas and phosphoric acid.

A further advantage to be obtained with the filter shown is that when working within the pH range above mentioned, I find that the impurities present in the coke-oven gas selectively combine with the impurities in the phosphoric acid with the formation of a precipitate insoluble in the solution. Such a precipitate is not gelatinous, as has already been observed in some disclosed processes, and, hence, is not difficult to remove from solution by filtration. By such means I am enabled to produce a diammonium phosphate of very high purity. In fact, I have obtained this salt in the form of well-formed crystals of higher purity than when using a pure form of ammonia.

Since I am able to produce, by my process, substantially pure, saturated, diammonium phosphate solution, I may readily produce therefrom a pure monoammonium phosphate. This is accomplished by withdrawing filtered diammonium phosphate solution from the system by means of the pipe 26, and treating the solution in a separate vessel with the theoretical amount of pure concentrated phosphoric acid. When producing pure monoammonium by this method, it is desirable to maintain the saturated solution of diammonium phosphate slightly above the saturation temperature (the temperature of the saturator) until the acid addition is complete, in order to prevent contamination of the monoammonium phosphate crystals with diammonium phosphate.

By varying the amount of acid added at this step, I may furthermore make mixtures of mono- and diammonium phosphate crystals in pure form, which, as has already been pointed out, is practically impossible to do because of the highly viscous solutions and gelatinous impurities encountered if such mixtures are attempted to be made in the saturator itself. Proceeding in this manner, I add the requisite amount of phosphoric acid to the filtered solution withdrawn from the saturator, to produce either the pure mono- or the mixture of mono- and diammonium phosphate desired, cool and crystallize in the usual way. The crystals are dewatered in a centrifuge in known manner.

I am not, however, limited to the production of monoammonium phosphate in the above manner. I may proceed by direct crystallization from the saturator in the following manner:

Monoammonium phosphate

The procedure when producing this salt by my process is in many ways similar to that above described for the diammonium salt, with, however, several important modifications. The temperature of the saturator may be maintained between 40° and 60° C., and somewhat more advantageously between the limits of 45° to 50° C. The hydrogen ion concentration of the saturator solution is important, because only within certain restricted limits is it possible to produce crystals which do not have the property of adhering to the sides of the saturator and which can easily be removed by a crystal ejector. The hydrogen ion concentration is preferably maintained between a range of pH of 5.6 to 6.2, and with considerable advantage may be maintained between the limits of 5.8 to 6.0. When the saturator liquor is maintained between the above-mentioned limits, the specific gravity and viscosity of the solution is still sufficiently low so that crystal growth and settling can take place at a rapid enough rate so that supersaturation of the solution with formation of numerous small crystals is prevented. If the pH of the solution is higher than 6.2, the mother liquor rapidly becomes heavier, reaching a specific gravity of 1.425 measured at 47° C. when the pH reaches a value of 6.7. The specific gravity of the solution at the upper limit of the optimum pH range (6.2) is 1.300, and is 1.24 at the lower limit (pH=5.6). It will thus be apparent that the optimum range of operability is rather sharply limited on the lower end of the range of pH by the formation of the needle-type of clinging crystals, and on the upper end of the range by the formation of small crystals in a highly viscous solution of high density.

It will be clear from the preceding description that I have invented a process for the production of mono- and diammonium phosphates and particularly one in which these phosphates may be produced in one type of apparatus by suitable change of operating conditions. Hence, in the preceding description, it will be apparent that where I have used the term "ammonium phosphates", I contemplate that it shall be construed to include only the mono- and diammonium salts.

Having now described several embodiments of my invention, it will be apparent that it is not so limited but is susceptible of various changes and modifications without departing from the spirit thereof; and I desire, therefore, that only such limitations be placed thereupon as may be indicated by the prior art or as are specifically set forth in the appended claims.

What I claim is:

1. A process for producing crystalline monoammonium phosphate, comprising reacting gaseous ammonia with phosphoric acid dissolved in a solution of ammonium phosphate maintaining the hydrogen ion concentration during reaction between the limits of pH=5.6 to pH=6.2.

2. A direct process for producing crystalline monoammonium phosphate, comprising reacting by-product coke-oven gas containing ammonia with phosphoric acid dissolved in a solution of ammonium phosphate, and maintaining the hydrogen ion concentration of the said solution during crystal formation between the limits of pH=5.8 to pH=6.0.

3. A process for producing non-adhering crystals of monoammonium phosphate, comprising reacting gaseous ammonia with phosphoric acid, and maintaining the hydrogen ion concentration of the solution during crystal formation between the limits of pH=5.6 to pH=6.2.

4. A process for continuously producing monoammonium phosphate, comprising reacting ammonia with phosphoric acid in solution and maintaining the hydrogen ion concentration therein between the limits of pH=5.6 to pH=6.2 by the addition of ammonia and phosphoric acid thereto.

5. A process for continuously producing monoammonium phosphate, comprising reacting ammonia with phosphoric acid in solution and maintaining the hydrogen ion concentration therein between the limits of pH=5.8 to pH=6.0 by the addition of ammonia and phosphoric acid thereto.

6. A process for producing monoammonium phosphate, comprising reacting together ammonia and phosphoric acid in solution under conditions to maintain in said solution a hydrogen ion concentration between the limits of pH=5.6 to pH=6.2.

7. A process for producing monoammonium phosphate, comprising reacting together ammonia and phosphoric acid in solution and in such proportions as to maintain in said solution a pH of more than 5.6 and less than 6.2.

8. A process for producing monoammonium phosphate, comprising reacting together ammonia and phosphoric acid in solution and crystallizing monoammonium phosphate therefrom while said solution is maintained at a hydrogen ion concentration between the limits of pH=5.6 to pH=6.2.

9. In a process for the production of monoammonium phosphate, the step of crystallizing monoammonium phosphate from solution while said solution is maintained between the limits of pH=5.6 to pH=6.2.

10. In a process for the production of monoammonium phosphate, the step of crystallizing monoammonium phosphate from solution while said solution is maintained between the limits of pH=5.8 to pH=6.0.

JOE E. MOOSE.